W. H. LIVINGSTON.
WIRE STRETCHER.
APPLICATION FILED JULY 23, 1910.
1,009,844.
Patented Nov. 28, 1911.
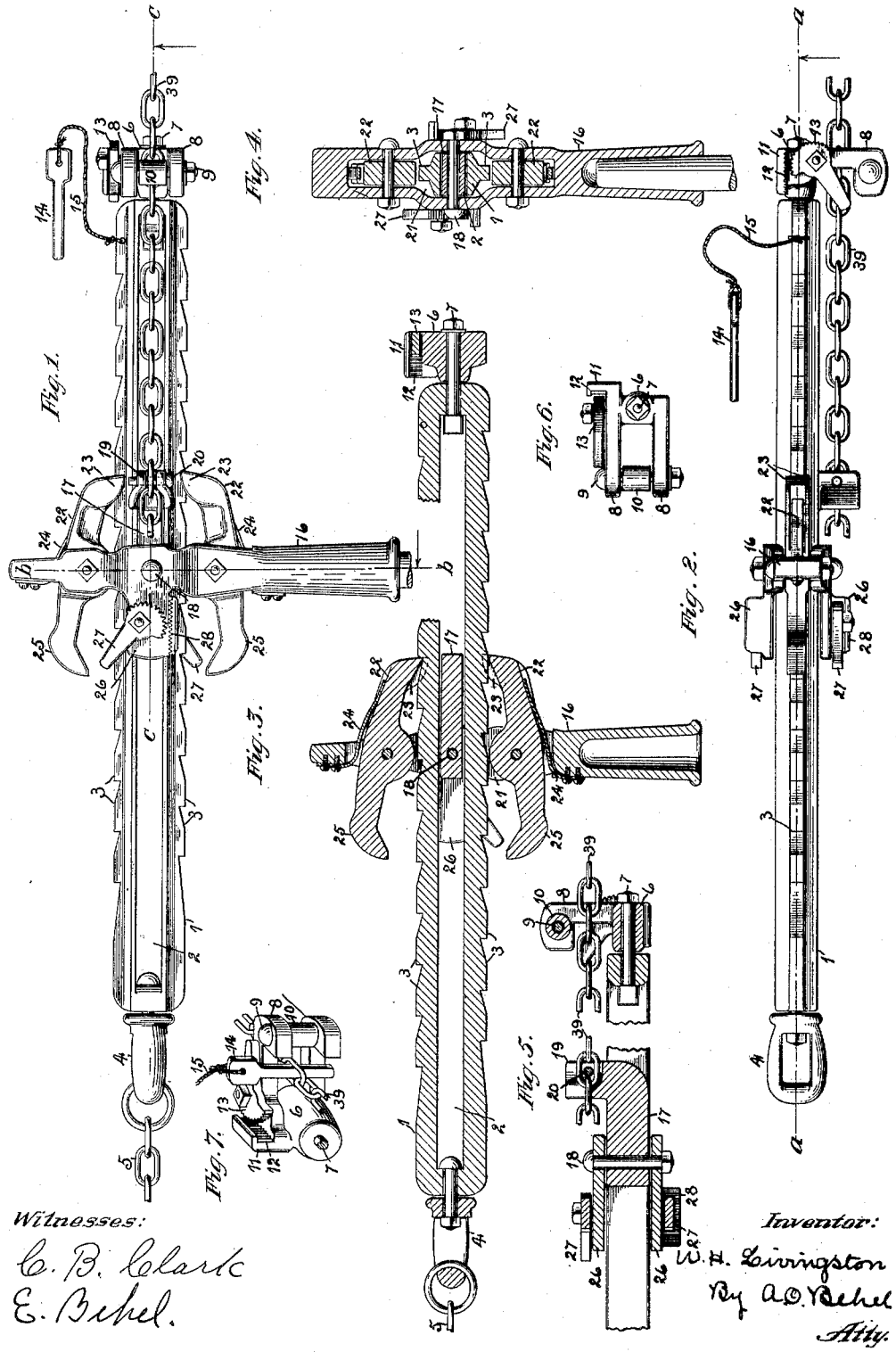

UNITED STATES PATENT OFFICE.

WILLIAM H. LIVINGSTON, OF ROSCOE, ILLINOIS.

WIRE-STRETCHER.

1,009,844.  Specification of Letters Patent.  Patented Nov. 28, 1911.

Application filed July 23, 1910. Serial No. 573,563.

*To all whom it may concern:*

Be it known that I, WILLIAM H. LIVINGSTON, a citizen of the United States, residing at Roscoe, in the county of Winnebago and State of Illinois, have invented certain new and useful Improvements in Wire-Stretchers, of which the following is a specification.

The object of this invention is to construct a wire stretcher which is applicable to stretch either strand or woven wire fencing.

In the accompanying drawings, Figure 1 is an upper face representation of the stretcher. Fig. 2 is an edge representation of the stretcher. Fig. 3 is a section on dotted line $a\ a$ Fig. 2. Fig. 4 is a section on dotted line $b\ b$ Fig. 1. Fig. 5 is a section on dotted line $c\ c$ Fig. 1. Fig. 6 is an end view of the stretcher in Fig. 1. Fig. 7 is a perspective view of the end shown at Fig. 6 in which a locking pin is placed within a link of a chain connected with a clamping head for woven wire fencing.

The stretcher comprises the main bar 1 provided with a lengthwise slot 2, and the edges of this bar are reduced in thickness and formed with teeth 3. To one end of the bar 1 is swiveled a yoke 4 to which is connected a chain 5. To the other end of the bar 1 is swiveled a combined clamp and guide comprising a head 6 through which a bolt 7 passes and connects it with the bar 1 in a swiveled manner. From this head extend two arms 8 connected by a bolt 9. A roller 10 is located between the arms and is supported by the bolt 9. From one of the arms 8 extends a lip 11 having a toothed face 12. To the arm having the lip 11 is pivoted an eccentric serrated faced clamp 13 and which is located adjacent to the toothed face 12. To the bar 1 is connected a pin 14 by the cord 15.

An operating lever 16 is guided in connection with the bar 1 by the block 17 located in a slot 2 of the bar. This block and operating lever are connected by a bolt 18. The block 17 has an outwardly extending end formed with the branches 19 connected by a pin 20.

The operating lever is formed with a transverse opening 21 which receives the bar 1.

Two dogs 22 are located in the opening 21 of the operating lever and are adapted to engage the teeth 3 of the bar 1 and the engaging ends are formed with lips 23 between which are received the reduced edges of the bar 1 in which the teeth 3 are formed. These lips prevent the lateral displacement of the dogs in connection with the teeth of the bar 1. A spring 24 is provided for each of the dogs 22 and holds it in engagement with the teeth 3. The dogs 22 are each provided with an extension 25 by which the other ends may be moved and held free of the teeth 3 so that the handle can be moved along the bar toward the head 6. By oscillating the hand lever the dogs will alternately engage the two rows of teeth 3, thereby moving the lever bodily along the bar 1. Each side face of the hand lever 16 has an extension 26 to which is pivoted a serrated faced eccentric lever 27 which is located adjacent to a serrated face 28.

When a line wire is being stretched, its free end is clamped in connection with one of the hand-levers of one of the clamps 27, and after the hand-lever has been moved the length of the bar 1, the wire is held by the clamp 13 in connection with the serrated face 12 until the hand-lever is moved near the clamp 13, and one of the clamps 27 receives the wire when the hand-lever can be again moved.

When it is desired to operate the hand-lever from the opposite side of the fence, the hand-lever is turned over which will present the other clamp 27 upward.

I claim as my invention.

1. In a wire stretcher, the combination with a bar, of stretching means movable longitudinally along the same, a cable-holding device and a wire holding device movable with the stretching means, and a head mounted on the bar and having a cable guiding device and a wire holding device, said head being movable to present either its cable holding device or its wire holding device in coaction with the corresponding device of the stretching means.

2. In a wire stretcher, the combination with a bar, of stretching means movable longitudinally along the bar, a cable holding device and a wire holding device movable with the stretching means and projecting from one side of the bar, and a head rotatably mounted on the one end of the bar and having a cable guiding device on one side and a wire holding device on the other side, said head being rotatable to present either its cable holding device or its wire holding device in coaction with the corresponding device of the stretching means.

In testimony whereof I have hereunto set my hand in presence of two subscribing witnesses.

WILLIAM H. LIVINGSTON.

Witnesses:
 A. O. BEHEL,
 A. McG. HUFFMAN.

Copies of this patent may be obtained for five cents each, by addressing the "Commissioner of Patents, Washington, D. C."